INVENTOR.
Erwin W. Henry

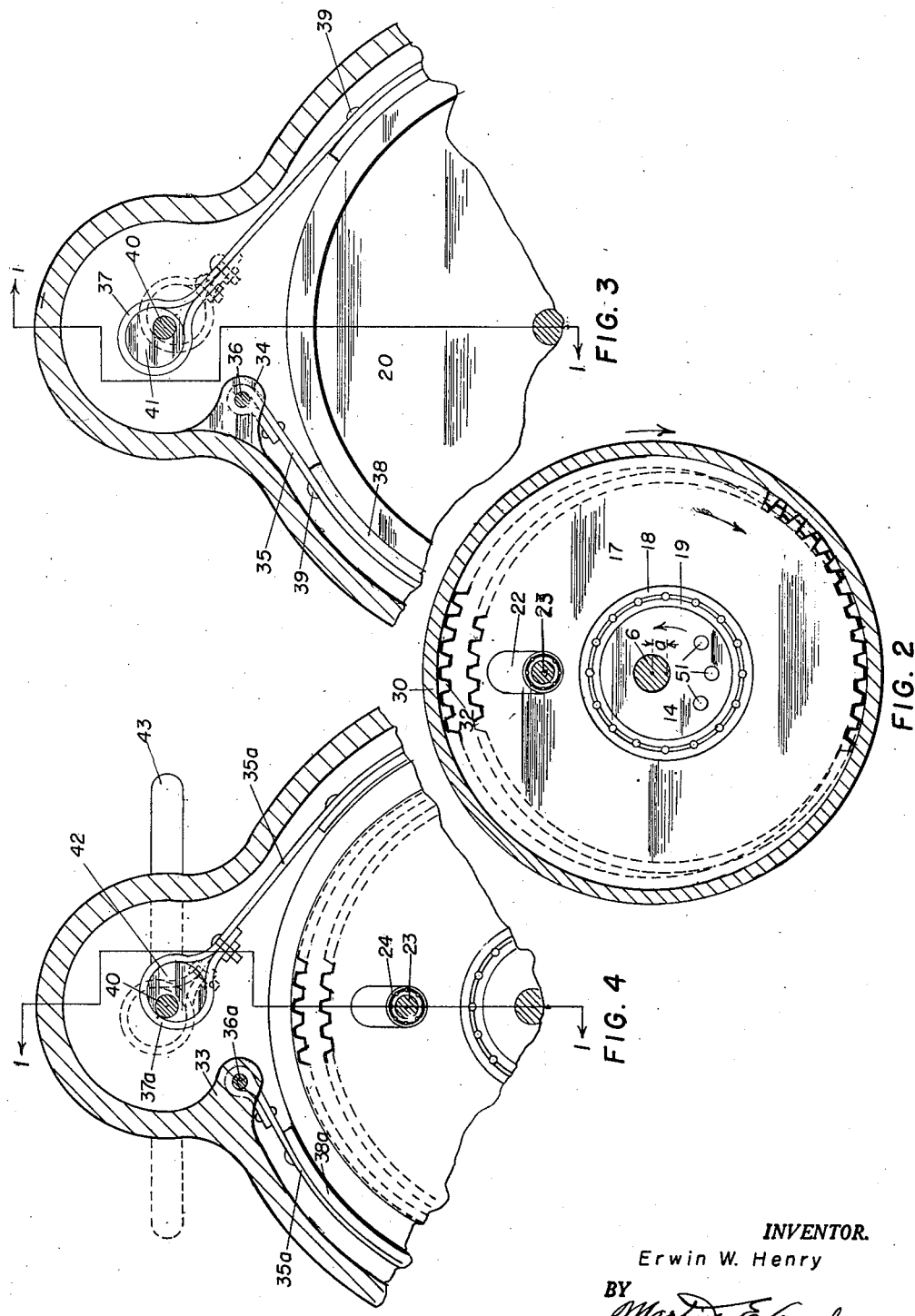

Aug. 14, 1945.          E. W. HENRY          2,382,482
SPEED REDUCTION GEAR
Filed Feb. 14, 1944          3 Sheets-Sheet 3
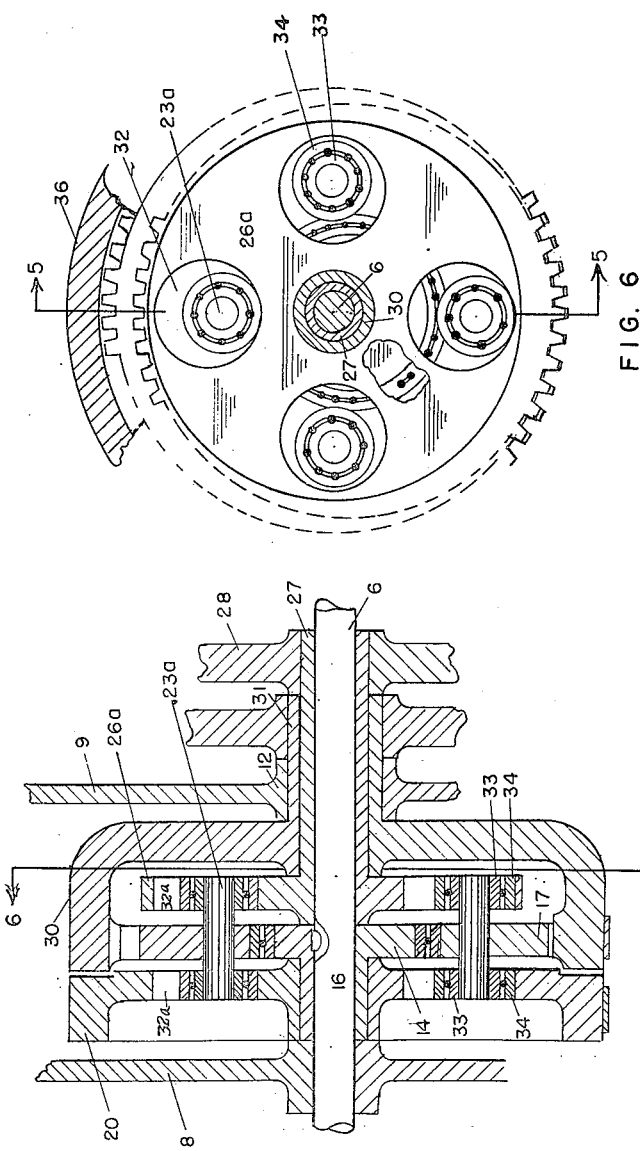
INVENTOR.
Erwin W. Henry
BY Martin E. Anderson
ATTORNEY.

Patented Aug. 14, 1945

2,382,482

UNITED STATES PATENT OFFICE 2,382,482

SPEED REDUCTION GEAR

Erwin W. Henry, Arapahoe County, Colo.

Application February 14, 1944, Serial No. 522,327

6 Claims. (Cl. 74—273)

This invention relates to improvements in speed reduction gears.

It is the object of this invention to produce a simple speed reduction gear that can be readily attached to a motor or other prime mover to effect a big speed reduction.

Another object of the invention is to produce a speed reducing gear of a simple substantial construction that can be manufactured and sold at a comparatively low price.

A further object of the invention is to produce a speed reduction gear mechanism that is reversible so that the prime mover does not have to be reversed in order to reverse the rotation.

The above and other objects that may become apparent as this description proceeds are attained by means of a construction and an arrangement of parts that will now be described in detail, and for this purpose reference will be had to the accompanying drawings in which the invention has been illustrated in its present preferred form, and in which:

Figure 2 is a partial section taken on line 2—2, Figure 1;

Figure 3 is a section taken on line 3—3, Figure 1;

Figure 4 is a section taken on line 4—4, Figure 1.

Figure 5 is a diametrical section similar to that shown in Figure 1, taken on line 6—6, Figure 6; and Figure 6 is a section taken on line 6—6, Figure 5.

Figure 1:
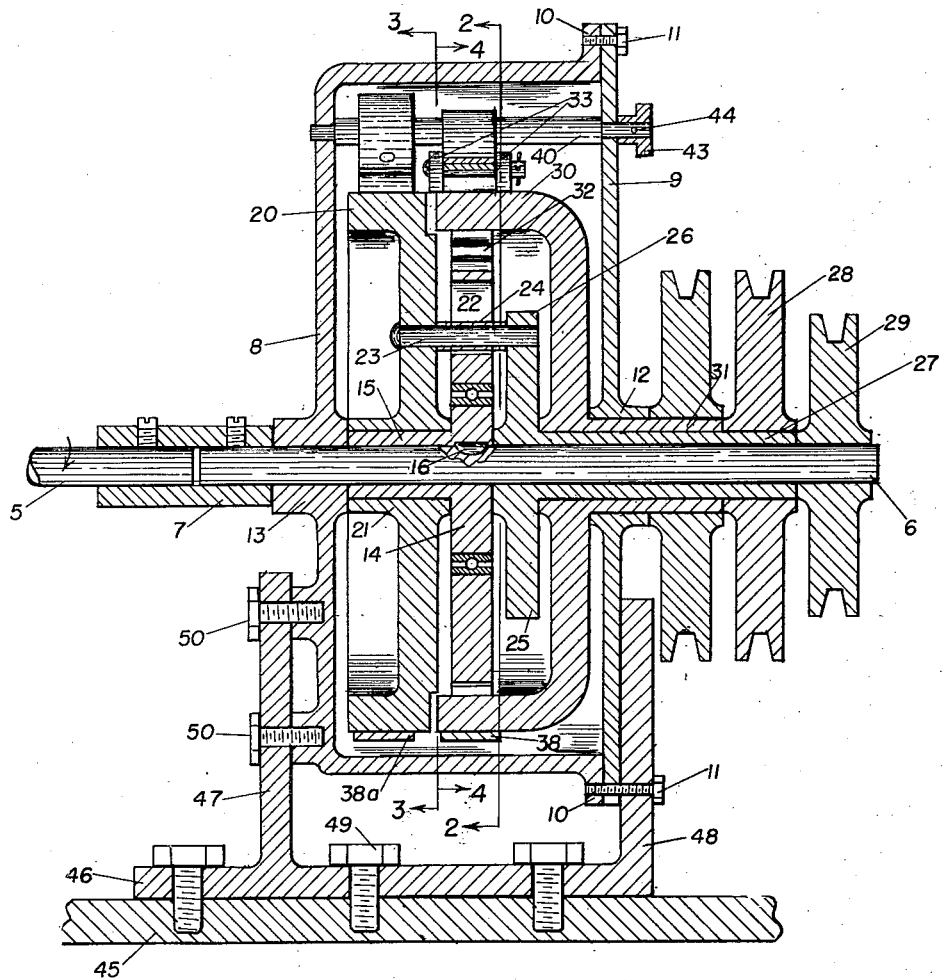
Figure 1 is a vertical diametrical section taken on line 1 in Figures 3 and 4.

In the drawings reference numeral 5 designates the shaft of an electric motor or any other prime mover and reference numeral 6 designates the drive shaft of the reduction gear, while reference numeral 7 designates a sleeve coupling for effecting a driving connection between the two shafts.

The mechanism consists of a housing 8 which may be a casting open on one side. The open side is closed by means of a cover 9 that is secured to the outwardly extending flange 10 of the housing by means of tap screws 11. The cover 9 and the bottom of the housing are each provided with tubular hubs 12 and 13, respectively. In the embodiment shown the drive shaft 6 is journalled in a bearing in hub 13 and extends through the tubular hub 12. Secured to the drive shaft is an eccentric 14 that has been shown as provided with a hub 15. This eccentric is held against rotation relative to the shaft by means of a key 16. Mounted on the eccentric is an externally toothed spur gear 17. In the embodiment shown an antifriction bearing comprising an outer race 18 and an inner race 19 has been provided between the eccentric and the spur gear. The eccentricity of the eccentric has been designated by $a$ in Figure 2. Positioned between the bottom of the housing and the eccentric is a brake drum 20 having a hub 21 that is journalled on the hub 15 of the eccentric. The spur gear 17 is provided with a radial slot 22 and the brake drum is provided with a pin 23 that extends through the slot in the manner shown in Figure 1. Surrounding the pin 23 is an ordinary needle bearing 24 which serves to reduce friction between the pin and the sides of the slot. Mounted for rotation on the drive shaft 6 on the side of the eccentric opposite from the one occupied by the brake drum is a crank disk 25. This disk is provided with an opening 26 for the reception of pin 23. It will now be evident that the eccentric gear 17, the brake drum 20 and the crank disk 25 are interconnected for conjoint rotation by means of the pin 23.

In the embodiment illustrated, the crank disk is provided with a tubular hub 27 that extends some distance beyond the outer surface of the cover 9. A grooved pulley 28 has been shown as secured to the outer end of hub 27 and a similar pulley 29 has been shown as secured to the outer end of the drive shaft 6. An internally toothed spur gear 30 having a hub 31 is journalled on the hub 27. This gear has a circular flange from the inner surface of which the gear teeth 32 project. The outer surface of hub 31 is journalled in the bearing provided therefor in hub 12.

Extending inwardly from the inner surface of the housing are two pairs of ears or lugs, one pair of which has been designated by reference numeral 33 and the other by reference numeral 34. The lugs 34 do not appear in view 1 because they are positioned on the opposite side of the section line. A reference to Figure 3 will, however, show the lugs 34. A brake strap 35 has one end anchored to the pin 36 which extends through the spaced lugs 34. This band extends around the brake drum 20 and terminates in a circular loop 37. A lining 38 is secured to the inner surface of the band by rivets 39 in the usual manner. A shaft 40 extends transversely of the housing as shown in Figure 1 and this shaft is provided with two eccentrics, one of which has been shown in Figure 3 and designated by reference numeral 41, and the other of which is shown in Figure 4 and designated by reference numeral 42. It will be seen from Figure 3 that the circular loop 37 at the end of the brake band strap 35 encircles eccentric 41. The brake has been shown in operative position by the full lines and in released position by the dotted lines. It is now apparent that by rotating shaft 40, the brake drum can be clamped against rotation or permitted to rotate.

In Figure 4 a brake band 35a has been shown and anchored to the pin 36a that extends through the spaced ears or lugs 33. This brake band is provided with a lining 38a and terminates in a circular loop 37a which encloses the eccentric 42.

Attention is now called to the fact that eccentrics 41 and 42 are positioned in opposition so that whenever the shaft 40 is rotated through an angle of 180 degrees or less, one of the brakes will be applied and the other one simultaneously released. For the purpose of rotating the shaft 40, a handle 43 is secured to the outer end of the shaft by means of a pin 44, or some other equivalent means, as shown in Figure 1. In Figure 4, the full line position of the handle corresponds with the full line position of the eccentric and the dotted line position of the handle with the dotted line position of the eccentric. The motor and the differential housing are both secured to a base such as a metal plate which has been designated by reference numeral 45. A bracket comprising a base 46 and two uprights 47 and 48 are secured to the plate 45 by means of tap screws 49. Tap screws 50 serve to secure the upright 47 to the housing in the manner shown in Figure 1 and in a similar way connection can be made between the upright 48 and the cover 9.

It will be observed from Figure 1 that the gear teeth on the two spur gears are operatively opposed and that the spur gear 17 is positioned within the internal spur gear 30. The addendum circles of the two gears have been shown as substantially identical and the eccentricity of the eccentric is substantially equal to the depth of the teeth or the distance between the addendum circle and the dedendum circle. Since the addendum circle of the spur gear 30 is concentric with the drive shaft 6, while the addendum circle of gear 17 is concentric with the eccentric, it follows that the two gears will at all times assume the position shown in Figure 2 with a portion of the teeth in mesh and the corresponding portion out of mesh. If we now assume that the internally toothed spur gear 30 is held stationary while the shaft 6 and eccentric 14 rotate in a counterclockwise direction, when viewed as in Figure 2, the gear segments in mesh will move in a corresponding manner as the center of the arc comprising the operatively engaged teeth will always be opposite the point of greatest eccentricity.

Since the drive shaft and the eccentric rotate at a fairly high speed, it is desirable to counterbalance the eccentric and since the eccentricity is comparatively small, this can be effected by boring a number of holes 51 in the eccentric, as shown in Figure 2. If further balancing is found necessary, this can be effected by suitable well known means.

When the internally toothed spur gear 30 is held from rotation, the spur gear 17, together with the brake drum 20, crank disk 25 and pulley 28 will all rotate at the same speed. The interconnection by means of the pin 23 passing through slot 22, permits the spur gear 17 to move radially with respect to pin 23.

If, instead of clamping the spur gear 30 against rotation, spur gear 17 is held from rotating the action is such that spur gear 30 will be rotated in a counter-clockwise direction when viewed as in Figure 2, and it is therefore possible to obtain rotation in two different directions without reversing the direction of rotation of the motor. This feature is of considerable importance where the gear is to be employed in connection with a machine or mechanism requiring reversal of motion, such as in a planer or a washing machine or some similar apparatus.

Where a reversal of motion is not desired, the brake drum 20 and also the two brakes can be dispensed with and the internally toothed spur gear secured nonrotatably within the housing.

Particular attention is called to the radially movable interconnection between the crank disk 25 and the spur gear 17 because without this the simple mechanism for making the power available on the outside of the housing could not be effected except by very complicated mechanisms, whereas, the use of this simple interconnecting means makes it possible to obtain the results desired with a mechanism of extreme simplicity.

If the high speed pulley 29 is not desired, it can be omitted and in that case the drive shaft 6 can terminate at any place within the tubular hub 27 and in a like manner, if rotation in one direction only is desired, the tubular hub 31 with its pulley can be omitted together with the brakes as above mentioned.

In Figures 5 and 6, a slightly modified form of construction has been shown which will now be described.

With the construction already described and illustrated in Figures 1 to 4, the crank disk 25 is connected with the spur gear 17 by means of a pin 23 operating in a radial slot 22 in the spur gear. Owing to the fact that the eccentric rotates much faster than the spur gear, the latter rocks around pin 23 as a pivot and at one time during each revolution, especially when that part of the eccentric having the greatest eccentricity passes the radial line on which pin 23 is positioned, the spur gear will pivot about this pin and as a result there will be a slight reverse movement of the gear teeth. This feature of the construction, although it is not of any material consequence when shaft 6 and eccentric 14 rotate at a slow speed, is however, highly objectionable when the parts rotate at high speed. At this point it might be mentioned that this rocking of the spur gear about pin 23 is most pronounced and in fact only objectionable at the time when the part of the rotating eccentric which is at the bottom in Figure 2, passes between the pin 23 and the shaft 6 and is not at all objectionable when the eccentric is positioned at 90 degrees from this point.

In order to overcome this objectionable feature, the modification illustrated in Figures 5 and 6 has been developed. In this modified form the crank disk has been designated by reference character 26a and has been provided with four openings 32, which are positioned at the same radial distance from the center of shaft 6 and are spaced ninety degrees apart. Instead of employing a single pin 23, as has been done in the construction shown in Figures 1 to 4, the spur gear 17 is provided with four pins 23a that are spaced equidistantly from the center and positioned at ninety degrees to each other as shown most clearly in Figure 6. In order to obtain as frictionless operation as possible, ball bearings comprising an inner ball race 33 and an outer ball race 34 are secured to the ends of the pins. At this point, it will be pointed out that the brake drum 20 has been provided with openings 32a positioned the same radial distance from the center as those in the crank disk.

The ball bearings are secured to the ends of the pins 23a by a pressed fit or in any other suitable manner and so spaced that they will lie in the planes of the crank disk 26a and the brake drum 20 as clearly shown in Figure 5. The diameter of the ball bearings is somewhat less than the diameter of the openings 32. Where the gears are so constructed as to get the maximum speed reduction, the throw of the eccentric will be just sufficient to separate the gear teeth and the difference in the diameters of the openings 32 and the ball bearings must be slightly greater than the depth of the teeth. In Figure 6 this difference in diameter has been shown somewhat greater as the eccentricity is greater than the minimum. It is found that with this construction the ball bearings will contact the sides of the openings 32 and effect the driving interconnection at points at right angles to the diameter of eccentricity and that they will be out of contact with the walls of openings 32 at that part of the rotation where the point of greatest eccentricity passes between the openings and the shaft 6. With this construction the objectionable rocking of the spur gear is eliminated because the driving connection between it and the disk takes place at right angles to the diameter of eccentricity or ninety degrees from the point shown in Figure 2. Due to the shifting of the parts, the roller bearings or ball bearings will roll along the inner surface of openings 32 and contact the walls of the openings during the greater portion of the rotation, but they form no pivot about which the spur gear can be reversely rocked as with the construction shown with Figure 2.

When the parts are interconnected as illustrated in Figures 5 and 6, a smooth and uniform rotation of the crank disk has been obtained which permits the device to be rotated from an ordinary motor turning at 1750 R. P. M. without setting up any objectionable vibrations due to the intermittent motion that results from the construction shown, for example, in Figure 2. Although in Figure 6 the crank disk has been shown as provided with four equiangularly spaced openings 32, it is pointed out that this is not an essential as any number greater than one can be employed. In case only two openings or ball bearings are provided, they must be angularly spaced ninety degrees apart. If a greater number than four are employed, the spacing must be correspondingly modified. For example, if six openings are provided, then they must be spaced sixty degrees and the same is true for any other number.

In the drawings the pins 23a have been shown as attached to the externally toothed spur gear and engaging in openings in the brake drum and in the crank disk. It is to be understood, however, that this arrangement may be reversed, if desired, so as to have the openings correspond to openings 32 in the spur gear and the pins secured to the brake drum and the crank disk.

Particular attention is called to the great simplicity of this reducing gear and to the fact that it can readily be adapted for use in connection with the transmission of small or large amounts of power. The gears can be made any size desired.

The specific construction shown and described is illustrative only and it is to be understood that mechanical equivalents can be substituted wherever desired without departing from the invention as defined in the claims.

Having described the invention what is claimed as new is:

1. A speed reduction gear comprising a drive shaft, an eccentric nonrotatably secured thereto, a spur gear rotatably mounted on the eccentric, a crank disk mounted for rotation about the axis of the drive shaft, the spur gear and crank disk having interconnecting means constraining them to conjoint rotation, an internally toothed spur gear mounted for rotation about an axis concentric with the drive shaft, the radius of the pitch circle of the externally toothed spur gear being substantially equal to the radius of the pitch circle of the internally toothed spur gear minus the eccentricity of the eccentric, the throw of the eccentric being at least equal to the depth of the teeth, and means for holding either the externally toothed spur gear or the crank disk from rotating, whereby when the drive shaft and eccentric are rotated the spur gears will turn relative to each other during revolution of the eccentric, thereby effecting a speed reduction.

2. A speed reduction gear comprising, in combination, a housing, a drive shaft journalled therein, an eccentric carried by the drive shaft and secured against rotation thereon, a brake drum on one side of the eccentric, mounted for rotation about the axis of the drive shaft, a spur gear carried by the eccentric and mounted for rotation thereon, a crank disk on the other side of the eccentric, mounted for rotation about the axis of the drive shaft and provided with an elongated hub, means for interconnecting the brake drum, the spur gear and the crank disk for conjoint rotation, an internally toothed spur gear provided with a tubular hub rotatably mounted on the hub of the crank disk, the radius of the pitch circle of the internal spur gear being equal to that of the external spur gear plus the throw of the eccentric, the throw of the eccentric being at least as great as the depth of the teeth, means for clamping the internally toothed spur gear against rotation, whereby the spur gear on the eccentric, the crank disk and the brake drum will rotate at a speed which is less than the speed of the drive shaft and in the opposite direction, means for clamping the toothed spur gear against rotation, and simultaneously releasing the internally toothed gear, whereby the last named gear will rotate at a speed less than the speed of the drive shaft and in the direction in which the eccentric rotates.

3. A speed reduction gear comprising, in combination, a housing, a drive shaft journalled therein, an eccentric carried by the drive shaft and nonrotatably secured thereto, a spur gear carried by the eccentric and mounted for rotation thereon, a brake drum on one side of the eccentric, mounted for rotation about the axis of the drive shaft, a crank disk on the other side of the eccentric, mounted for rotation on the drive shaft, means interconnecting the brake drum, the spur gear and the crank disk for conjoint rotation, the crank disk having a tubular hub through which the drive shaft extends, an internally toothed spur gear mounted for rotation on the hub of the crank disk, the teeth of the two spur gears being operatively opposed, the radius of the pitch circle of the internal spur gear being substantially equal to the radius of the pitch circle of the external spur gear plus the throw of the eccentric, the throw of the eccentric being substantially equal to the depth of the teeth, and means for alternately clamping and releasing the brake drum and the internally toothed spur gear whereby either gear may be rotated at a reduced speed when the drive shaft rotates.

4. A speed reduction gear comprising a drive shaft, an eccentric nonrotatably secured thereto, a spur gear rotatably mounted on the eccentric, a crank disk mounted for rotation about the axis of the drive shaft, the spur gear and crank disk having interconnecting means constraining them to conjoint rotation, said means comprising a plurality of angularly spaced pins carried by the spur gear projecting from the side thereof, the crank disk having a plurality of openings spaced to receive the pins, the diameters of the openings being greater than that of the pins by at least the throw of the eccentric, an internally toothed spur gear mounted for rotation about an axis concentric with the drive shaft, the radius of the pitch circle of the externally toothed spur gear being substantially equal to the radius of the pitch circle of the internally toothed spur gear minus the eccentricity of the eccentric, the throw of the eccentric being at least equal to the depth of the teeth, and means for holding either the externally toothed spur gear or the crank disk from rotating, whereby when the drive shaft and eccentric are rotated the spur gears will turn relative to each other during revolution of the eccentric, thereby effecting a speed reduction.

5. A speed reduction gear comprising, in combination, a housing, a drive shaft journalled therein, an eccentric carried by the drive shaft and secured against rotation thereon, a brake drum on one side of the eccentric, mounted for rotation about the axis of the drive shaft, a spur gear carried by the eccentric and mounted for rotation thereon, a crank disk on the other side of the eccentric, mounted for rotation about the axis of the drive shaft and provided with an elongated hub, means for interconnecting the brake drum, the spur gear and the crank disk for conjoint rotation, said means comprising a plurality of pins carried by and secured in angularly spaced relation to the spur gear, the pins projecting from both sides thereof, the brake drum and the crank disk having openings positioned and spaced to receive the pins, the diameters of the openings being larger than that of the pins by an amount at least as great as the throw of the eccentric, an internally toothed spur gear provided with a tubular hub rotatably mounted on the hub of the crank disk, the radius of the pitch circle of the internal spur gear being equal to that of the external spur gear plus the throw of the eccentric, the throw of the eccentric being at least as great as the depth of the teeth, means for clamping the internally toothed spur gear against rotation, whereby the spur gear on the eccentric, the crank disk and the brake drum will rotate at a speed which is less than the speed of the drive shaft and in the opposite direction, means for clamping the toothed spur gear against rotation, and simultaneously releasing the internally toothed gear, whereby the last named gear will rotate at a speed less than the speed of the drive shaft and in the direction in which the eccentric rotates.

6. A speed reduction gear comprising, in combination, a housing, a drive shaft journalled therein, an eccentric carried by the drive shaft and nonrotatably secured thereto, a spur gear carried by the eccentric and mounted for rotation thereon, a brake drum on one side of the eccentric, mounted for rotation about the axis of the drive shaft, a crank disk on the other side of the eccentric, mounted for rotation on the drive shaft, means interconnecting the brake drum, the spur gear and the crank disk for conjoint rotation, said means comprising a plurality of pins carried by and secured in angularly spaced relation to the spur gear, the pins projecting from both sides thereof, the brake drum and the crank disk having openings positioned and spaced to receive the pins, the diameters of the openings being larger than that of the pins by an amount at least as great as the throw of the eccentric, the crank disk having a tubular hub through which the drive shaft extends, an internally toothed spur gear mounted for rotation on the hub of the crank disk, the teeth of the two spur gears being operatively opposed, the radius of the pitch circle of the internal spur gear being substantially equal to the radius of the pitch circle of the external spur gear plus the throw of the eccentric, the throw of the eccentric being substantially equal to the depth of the teeth, and means for alternately clamping and releasing the brake drum and the internally toothed spur gear whereby either gear may be rotated at a reduced speed when the drive shaft rotates.

ERWIN W. HENRY.